United States Patent [19]
Olivo, Jr.

[11] Patent Number: 5,172,111
[45] Date of Patent: Dec. 15, 1992

[54] STORED MEDIA SCREENING DEVICE

[76] Inventor: John W. Olivo, Jr., 1105 Harmon Cove Towers, Secaucus, N.J. 07094

[21] Appl. No.: 457,309

[22] Filed: Dec. 18, 1989

Related U.S. Application Data

[63] Continuation-in-part of Ser. No. 91,646, Aug. 31, 1987, Pat. No. 4,888,796.

[51] Int. Cl.[5] .................. G11B 20/00; H04M 1/00; H04M 11/08; H04N 7/167
[52] U.S. Cl. ................... 340/825.31; 360/27; 369/48; 379/67; 379/87; 379/101; 379/199; 455/26.1
[58] Field of Search .............. 360/14.3, 14.2, 27, 360/28; 369/48, 47; 455/26.1; 358/349; 340/825.31, 825.3; 379/67, 88, 77, 87, 69, 96, 101, 188, 189, 199

[56] References Cited

U.S. PATENT DOCUMENTS

| | | | |
|---|---|---|---|
| 4,114,139 | 9/1978 | Boyd et al. | 340/825.31 |
| 4,266,098 | 5/1981 | Novak | 379/77 |
| 4,333,113 | 6/1982 | Kalinowski | 360/27 |
| 4,536,791 | 8/1985 | Campbell et al. | 358/147 X |
| 4,567,531 | 1/1986 | Tabata | 358/335 |
| 4,574,319 | 3/1986 | Konishi | 358/335 |
| 4,588,857 | 5/1986 | Arsem | 379/77 X |
| 4,591,664 | 5/1986 | Freeman | 379/73 |
| 4,591,931 | 5/1986 | Baumeister | 360/72.1 |
| 4,598,288 | 7/1986 | Yarbrough et al. | 358/349 X |
| 4,600,921 | 7/1986 | Thomas | 340/825.31 |
| 4,602,297 | 7/1986 | Reese | 360/14.1 |
| 4,618,895 | 10/1986 | Wright | 358/311 |
| 4,695,904 | 9/1987 | Shimyagaito et al. | 358/342 |
| 4,718,107 | 1/1988 | Hayes | 455/4 |
| 4,794,474 | 12/1988 | Dwyer et al. | 360/72.2 |
| 4,939,596 | 7/1990 | Takayawa et al. | 360/27 |

FOREIGN PATENT DOCUMENTS

| | | | |
|---|---|---|---|
| 0135783 | 4/1985 | European Pat. Off. | 455/26.1 |
| 3621263 | 1/1988 | Fed. Rep. of Germany | 360/14.3 |
| 0052683 | 4/1980 | Japan | 358/349 |

*Primary Examiner*—Thomas W. Brown
*Attorney, Agent, or Firm*—Leon R. Yankwich

[57] ABSTRACT

A program material screening device is provided whereby the owner/operator of a program material playback device such as a videocassette player, television, laser disc player, motion picture projector, phonograph or the like may automatically and selectively prevent the reproduction into humanly perceivable form of unwanted program material. The screening device is capable of recognizing non-interfering material content signals stored along with the program signals that are reproduced by the program material playback device, and is capable of automatically disabling the playback device in response to the recognition of the material content signal.

18 Claims, 5 Drawing Sheets

STORED MEDIA SCREENING DEVICE

This application is a continuation-in-part of U.S. application Ser. No. 091,646, filed Aug. 31, 1987 and now as U.S. Pat. No. 4,888,796, issued Dec. 19, 1989.

FIELD OF THE INVENTION

The present invention relates to a device for controlling the replay or reproduction of information that is stored in and/or reproduced from electromagnetic or optical storage media, such as video or audio tapes, magnetic discs, films and semiconductor memories. More particularly, the invention is directed to a program material screening device that can be utilized to screen out material that is not considered desirable by the user/operator of a program material replay device. Such a screening device can also be used by the supervisor of a replay device (e.g., parent) to automatically prevent unauthorized users (e.g., minor children) from viewing and/or listening to certain program materials.

BACKGROUND OF THE INVENTION

The present invention addresses several recent problems arising from the advent of sexually explicit or excessively graphic or violent material being made freely available to minors through various unregulated media such as videocassette rentals, broadcast and cablecast television, radio broadcasts, widely distributed laser disc programs, video games, phonograph albums and audio cassette tapes, optical films and various computer text databases.

Heretofore, there have not been many restrictions imposed on the purveyors of such program material, although some parents and governmental officials have expressed strong interest in controlling its availability or at least preventing minors from freely receiving it. Because overburdensome government regulation or censorship of the providers of explicit program material is limited by the First Amendment and interferes with the legitimate desires of adults who wish to receive such material, there is a strong need to provide a means for selectively screening out or preventing replay of unwanted program material when the replay device (i.e., television, videocassette player, high fidelity audio equipment, movie projector, computer) is operated by a child or other unauthorized person, or when the explicit program material is replayed for broadcast via radio, broadcast or cable television, telephone transmission, or the like, to an unsuspecting audience.

In the realm of explicit or violent program material, several solutions have been proposed to restrict distribution of certain types of program material. These include labelling exterior packages with content warnings, segregating explicit program material within a retail outlet, and the adoption of policies providing that only adults can rent or purchase certain program material. However, such policy measures are easily circumvented and fail to reliably impose the desired restrictions on the distribution of the objectionable material. For example, exterior package warnings, (e.g., notices on phonograph album jackets warning of explicit musical lyrics) have no effect in preventing distribution of forbidden material to a child unless the forbidding parent or guardian is present at the point of sale. Likewise, the effectiveness of segregating program material (e.g., a separate "adult" video section of a videocassette rental outlet) and adopting a store policy of refusing sale to minors is undermined by subterfuge, and whereas many vendors will readily adopt a store policy, very few are willing to take the responsibility to guarantee that the policy is in all cases carried out.

The present invention provides a means for directly screening program material recorded on various types of storage media and permits regulation of the unauthorized replay of the stored program material. The invention thus provides a means of regulating the playback of a program from storage media, even where the distribution of the storage media cannot be effectively controlled.

The invention combines the advantages of requiring minimum effort and expense on the part of those who produce, record or distribute, broadcast or otherwise transmit a given program and minimum effort on the part of the potential receiver who wishes to restrict access to the program material, while requiring no additional effort on the part of legitimate customers who wish to freely receive such program material. The device of this invention can be implemented on all types of program material playback equipment, including but not limited to televisions, radios, videotape recorders, phonographs, audio tape recorders, laser disc players, motion picture projectors, computers, etc.

SUMMARY OF THE INVENTION

The method according to the present invention involves associating a material content signal with recorded (or "stored") program material, which signal is carried with the program material as it is subsequently duplicated and also reproduced by playback equipment, such as video or audio tape players, laser and magnetic disc players, phonographs, computers, film projectors, etc. In accordance with this invention, playback equipment owners or operators can equip their program material playback equipment with a program material screening device capable of detecting the material content signal, and the program material screening device can be selectively set (at the option of the owner or operator) to automatically disconnect or otherwise interfere with the normal function of the playback equipment in response to the material content signal, thereby preventing replay of the program material. The program material screening device is preferably integrated physically into at least one component of the program material playback equipment in order to discourage unauthorized bypassing.

As used herein, the term "playback equipment" encompasses any electronic or optical device or collection of interconnected electronic or optical devices capable of replaying recorded or stored program material from a fixed medium in a form that is humanly perceivable. Playback equipment may comprise more than one component, for example in the case of video equipment, where a video cassette player must be connected to video and audio monitors before humanly perceivable video and audio signals corresponding to the program material stored on the cassette are emitted. In some embodiments contemplated herein, playback equipment may convert the stored program material into a series of distinct electromagnetic signals before converting the signal in the final stage to a form readily perceived by humans. For example, in the case of a cable television network, a program stored electromagnetically on videotape or optically on film may be initially converted to a microwave signal by appropriate equipment for distribution to remote antennas, where the signal may be in turn converted to an electronic signal suitable for transmission by cable to a properly equipped television before the converted program material is converted into a signal that is useful to human cable viewers. Each component of the playback equipment provides a potential site for the insertion of a material content signal corresponding to the program material being transmitted; and each component "downstream" of the insertion of the material content signal also provides a potential site for a properly configured program material screening device according to the invention capable of recognizing the material content signal and interfering with or altering the program material in response to the material content signal.

The method of the present invention is carried out by supplementing stored program material with a non-interfering material content signal. The material content signal, or "MCS", does not interfere with or otherwise affect the routine replay of the program material from its stored medium, that is, the MCS is intended to be "invisible" to playback equipment that is not designed or modified to detect the MCS. The material content signal includes information relating to the content of the program material it corresponds to. For instance, the material content signal may provide only the Motion Picture Association of America (MPAA) rating (i.e., R, PG-13, PG or G) and/or the so-called "X" rating for a movie recorded on videotape or film. Alternatively, the material content signal can include complex information relating to the program content of particular scenes of the program material, thus enabling the scenes (or even individual frames) of a movie to be rated on a scene-by-scene (or frame-by-frame) basis. Depending on the complexity of the material content signal a screening device according to this invention could monitor the material content signal and prevent playback of an entire movie having a certain overall rating, or prevent playback only of the particular scenes or frames having that rating. In particular embodiments of this invention, detection of the material content signal will lead during playback to the substitution of highly rated scenes (e.g., X) with lower rated scenes (e.g., R or PG-13).

If it is stored in the same medium, the material content signal may preface the program material or be provided periodically, randomly, or continuously throughout the stored program material. Also, the material content signal can vary as often within the program material as desired.

The material content signal may be created and added during the original performance or production of the program material, or it may be added or modified at a later stage, after the program material has been recorded or stored in a fixed medium.

For example, a material content signal indicating PG-13, R or X movie ratings can be recorded with the program material originally or, alternatively, recorded onto videocassettes of the movie in post-production, by general distributors or by vendors or rentors at retail outlets. Any party in the chain of distribution of the videocassette may suitably add, modify or delete the material content signal. The MCS may also be used in connection with ephemeral recordings, such as those associated with "live" television and radio broadcasts. For example, where a "shock radio" announcer uses language that might be considered unsuitable, the radio station censor or program director may time-delay transmission of the speech in a temporary storage register and "tag" the interval with an appropriate MCS before the speech is transmitted normally. The MCS can identify grades of language (e.g., with a system akin to movie ratings) and the radio listener can select the grade he or she wants to receive. Thus, the radio listener can decide whether certain speech can be replayed on his or her personal radio, and the corresponding MCS can be used to set the radio to mute radio audio output for any period of time.

The material content signal is detected at or prior to receipt of a signal corresponding to the program material by the playback equipment by means of a program material screening device in accordance with this invention. The program material screening device of this invention recognizes the MCS and then automatically and at the option of the owner/operator selectively enables, disables or edits the program material output.

Generally, the program material screening device of the present invention is incorporated as a part of or installed as an ancillary fixture of the playback equipment. Most advantageously, the program material screening device of the invention will be designed and configured for installation on or in the final component(s) of the playback equipment, specifically the component(s) owned or operated by the end user and capable of producing the program material in humanly perceivable form. Such end-user operated components will include any electronic or optical sound or video reproduction devices, e.g., a television, radio, telephone, optical movie projector, laser disc reader, audio or video tape players or recorders, phonographs, computers, or any device capable of replaying stored program material (or input signals from stored media) in a humanly perceivable form. (See discussion infra, of FIG. 1, especially items 7 and 11)

The system of the present invention differs from a system where the program material is scrambled, in that the program material signal itself is not generally altered and, without the intervention of the program material screening device of the invention, is received without detectable alteration by playback equipment owners who are not concerned with screening the stored program material. The material content signal, which may be added to the stored program material at its origin, added during any subsequent storage or duplication, or added to a previously recorded program by a rating authority or other concerned individual, and may be subsequently duplicated along with the corresponding program material, is a simple or complex coding signal that may be generated by existing equipment. The screening device of the present invention operates in response to detection of a material content signal, and in the absence of a detectable material content signal, the screening device does not interfere or otherwise affect the replay of the program material, as is the case with a descrambling device.

DETAILED DESCRIPTION OF THE INVENTION

Figure 1:
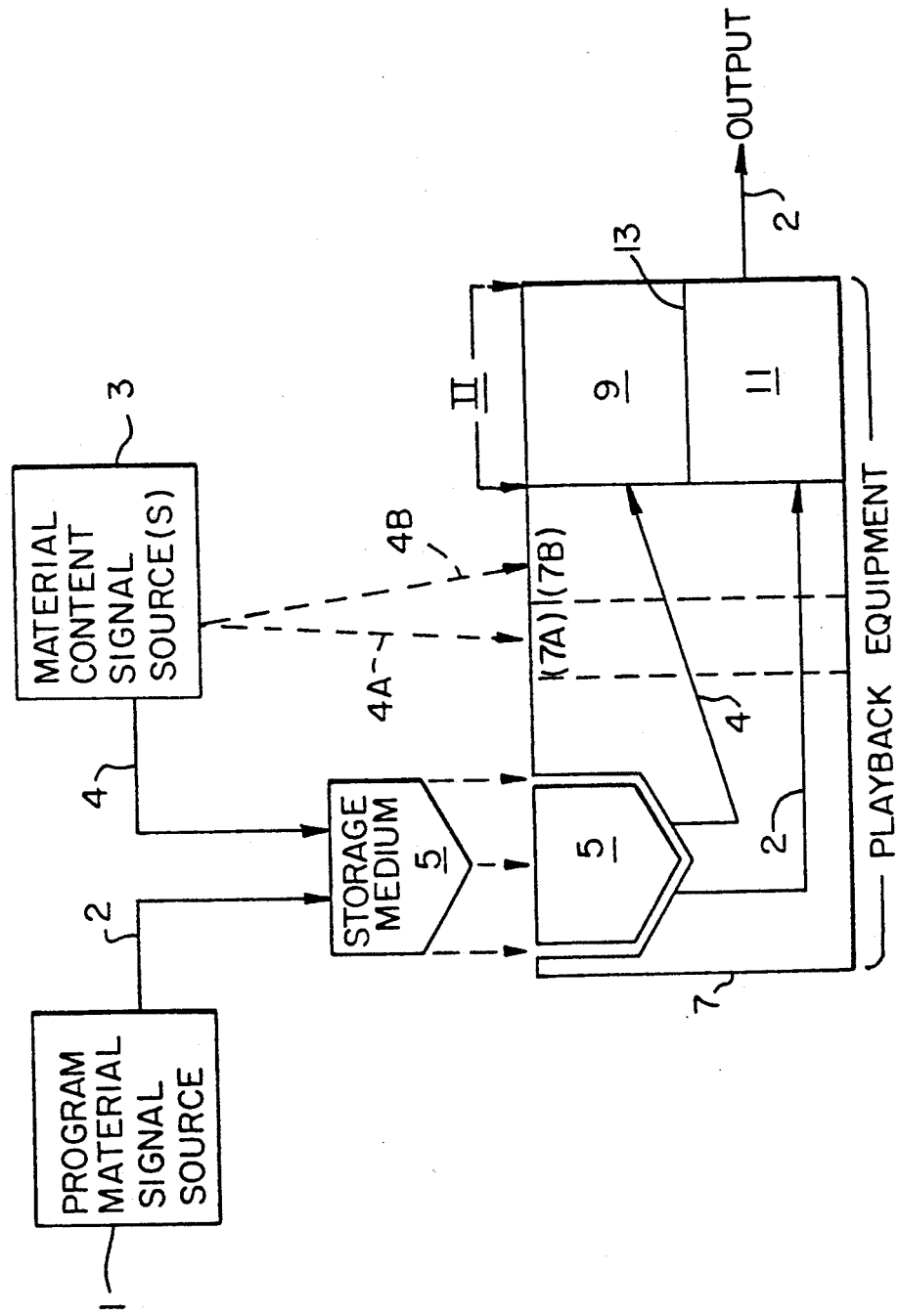
FIG. 1 is an overall block diagram of the present invention.

A general diagram of the present invention is set forth in FIG. 1. An electronic or electromagnetic program material signal (2) emanates from a program material signal source (1). The program material signal source (1) may be a live performance, picked up by microphone or camera for electronic transmission, or may be a signal from a radio or television broadcast or a signal reproduced (i.e., on playback equipment) from a previous recording, such as a phonograph record, film, video or audio tape, microchip, computer disc, laser disc. Any signal capable of being recorded or stored for subsequent replay in a storage medium is contemplated.

The program material signal (2) is recorded in a storage medium (5) by conventional means. Examples of suitable storage media include phonograph records, videotapes, audio tapes, video game cartridges, computer discs and tapes, laser readable discs, temporary storage registers, optical film, and the like. Simultaneously with the recording of the program material signal, or more advantageously at some time thereafter, a material content signal (4) generated from a material content signal source (3) and containing information relating to the nature of the program material is also recorded on the storage medium (5). The storage medium may then be copied, stored, shipped or otherwise distributed to end users interested in replaying the stored program material signal (2).

For replay of the program material signal (2), the storage medium must be used with appropriate playback equipment (7, 7A, 7B, 11) which will consist of one or more components capable, ultimately, of causing the program material to be emitted in a humanly perceivable form (output). For example, the program material signal (2) may be music recorded on a magnetic tape cassette (5), and the appropriate playback equipment will include a tape replay device (7) (e.g., "tape deck") capable of reading the magnetic signals stored on the tape, optional preamplification or noise reduction components (e.g., 7A, 7B), and finally, appropriate components, e.g., amplifier and loudspeaker(s) (combined in 11) suitable for generating a humanly perceivable output signal from the electronic program signal (2).

In another example, the program material may be a television program pre-recorded on videotape (5), and the appropriate videotape playback equipment will include a video cassette recorder (VCR) (7) and a television monitor (11), including picture tube and loudspeakers capable of emitting the appropriate output (video and audio).

Many playback schemes, of course, will not have all of the playback equipment in one location or operated by the same person. For instance, the program material signal (2) may be a movie stored on videotape (5), and the first component of the playback equipment may be a tape player (7) operated by a television network, capable of converting the stored program material signal (2) (and any stored material content signal (4) as well) into a broadcast signal such as microwave, radiowaves, and the like. The replayed signals (2, 4) may be amplified, relayed or distributed through additional components (e.g., 7A, 7B) such as communications satellites, microwave relays, and the like, to reach home playback equipment (11), e.g., televisions, radios, computers, telephones, etc.

Such a multiple component playback scheme, especially where the program material signal (2) is converted for broadcast transmission or rerecorded to the same or a different storage medium, leads to additional opportunities where a material content signal can be associated with the program, or an additional material content signal can be inserted in the transmission (4A, 4B). An example of this would be the radio station replay of a previously recorded program (2), which may already have one MCS associated with it (4), wherein additional MCS radio signals (4A, 4B) are simulcast by one or more third parties (3), for the purpose of providing a more stringent, or a less restrictive, MCS.

The radio program, to more particularly illustrate this example, may be a broadcast in a so-called "shock radio" format, involving explicit speech on lurid or graphic themes. The radio program source, i.e., the announcer (1), creates an electronic program signal (2) by speaking into a microphone. The program signal (2) is fed automatically through a time delay register (5), creating an ephemeral recording of the program. The program director (3) monitoring the program provides a material content signal (4), which becomes associated with particular intervals of the program in the register (5). Such material content signals may be used to denote only particular types of speech, for instance, obscene words, or may be used to make fine gradations between types of speech, assigning a varying MCS "rating" to each interval. Alternative MCSs (4A, 4B) can be imported from one or more third parties (e.g. via telephone line) and associated with the shock radio program (2) in the time-delay register (5), and the program and MCS signals are then broadcast normally over the airwaves The "shock radio" program signal (2) is received by the listener over a radio (11). If the radio is equipped with a program material screening device (9) according to the invention, the various MCS signals (4, 4A, 4B) are received by the screening device (9) and, on an interval-by-interval basis, the radio output is edited automatically, in accordance with the preset instructions of the radio owner. For instance, if the screening device is preset to respond to alternative MCS 4B, which may be from a "concerned parents' organization" or the like, the screening device detects the instructions contained in MCS 4B and controls, through an electronic connection (13), the audio output of the radio (11). Control of the output may involve simply blanking the interval (no sound), turning off the radio automatically, or supplying a data signal to the radio leading to the output of an alternative output signal, as where receipt of a particular MCS automatically causes the screening device (9) to instruct the radio (11) to tune to another station or a normally inaudible radio station subcarrier. In alternative embodiments, program material screening devices (9) can be used in connection with telephones, video cassette recorders, televisions, radios, record players, tape players, film projectors, computers, or any interconnected combination of these devices with other audio/video play back equipment (7, 7A, 7B and 11). Screening devices (9) are responsive to material content signals (4), which signals can be embedded in or within various storage media (5), e.g., magnetic tape, film, phonorecords, microchips or laser readable discs.

Figure 2A:
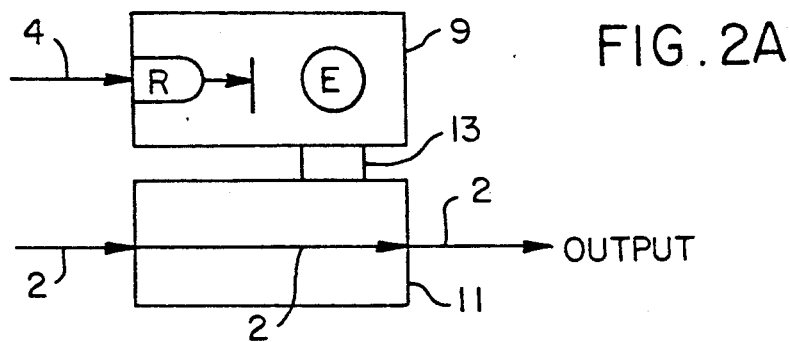
FIGS. 2A, 2B and 2C are schematic diagrams depicting detail II of FIG. 1 and showing the operation of a device according to the invention.
Figure 2B:
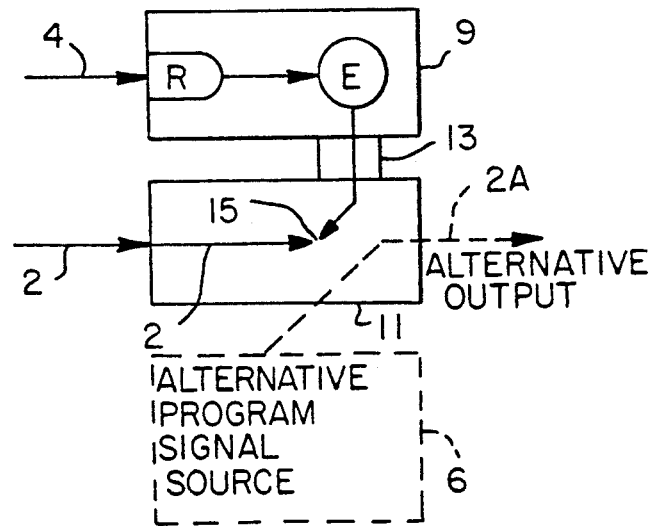
Figure 2C:
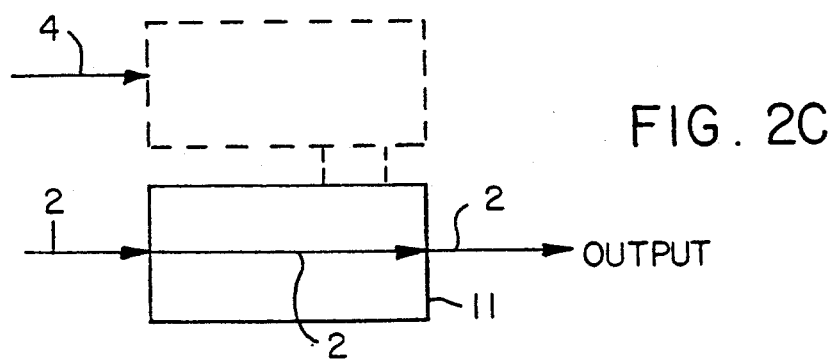

Referring to FIGS. 2A, 2B and 2C, a detail (II of FIG. 1) of the overall invention is illustrated. FIGS. 2A, 2B and 2C show the three possible configurations that home playback equipment can take in light of the present invention. FIG. 2A depicts a situation in which the playback equipment owner/operator has installed a screening device (9) of this invention and connected it (13) to a playback device (11). Such playback devices (11) will include, for example, telephones, televisions, radios, record players, tape players, computers (including video game machines), film projectors, or other playback devices capable of producing humanly perceivable output from an electronic or optical signal input. In FIG. 2A, the owner/operator has selected to receive all program material signals (2) without interference on the basis of any MCS (4) that may accompany the program material signal (2). The screening device (9) is equipped with recognition means (R) that detects an incoming MCS (4), however in this case the screening device (9) has been set so that the recognition means (R) is cut off from the execution means (E), so that reception of the material content signal (4) does not affect reception and playback of the program material signal (2) by the playback device (11). FIG. 2B depicts a situation in which the playback device owner/operator has elected not to replay certain program material, and accordingly has set the screening device (9) so that the recognition means (R) is engaged with the execution means (E). Upon reception by the screening device (9) of the material content signal (4), replay of the program material signal (2) by the playback device (11) is prevented or altered (shown at 15). Depending on the particular embodiment and the desires of the user, the execution means (E) can prevent playback of all or part of a program by blocking the signal, interrupting the signal for a specific period of time, turning off the playback unit entirely, or (as represented in FIG. 2B by dotted lines) instructing the playback unit (11) to substitute alternative programming signals (2A) for output. The alternative programming may take any of a wide range of forms, depending on the desires of the owner/operator. For instance, in an embodiment where the playback device is a television, the alternative output prompted by the reception of a particular MCS may be a stationary on-screen display (such as a sign proclaiming "PROGRAM BLOCKED"), a prerecorded message (such as a short video program instructing the viewer on the nature of the program), or, preferably, a series of alternative scenes, corresponding to the program material in context but of a more acceptable (to the owner/operator) content, which are substituted and synchronized with the program material so as to provide what appears to be an uninterrupted program output. FIG. 2C depicts the situation in which the playback device (11) is *not* equipped with a screening device according to the invention (represented by the outline of a screening device as in 2A and 2B using dotted lines), and thus the MCS (4) is, of course, not detected and the program material signal (2) is replayed normally, without interference of any sort, by the playback device (11).

A specific embodiment of the present invention is described below for use with videotaped program materials. In general, a videotape screening device according to the invention will be adapted to be connected to a videotape replay device (e.g., VCR) and will include:

(a) recognition means capable of detecting a prerecorded material content signal residing on a videotape together with a pre-recorded program material signal, and capable of providing an instruction signal output in response to detecting said material content signal, (b) execution means capable of detecting said instruction signal output from recognition means (a) and activating in response to said instruction signal at least one program alteration circuit, which program alteration circuit is capable of blocking replay by said replay device of the program material signal from said videotape or of altering the output of said replay device.

Figure 3:
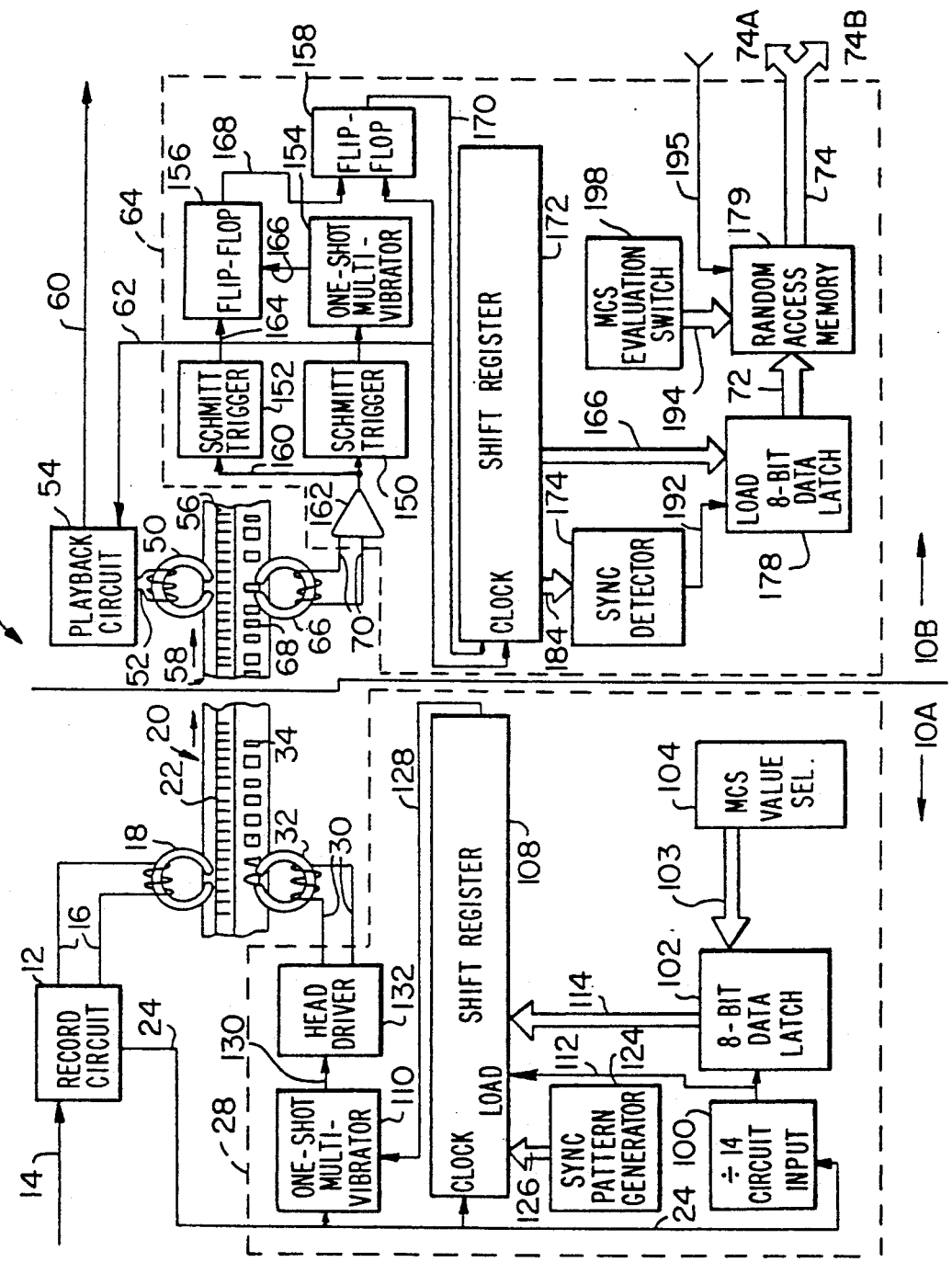
FIG. 3 is a schematic diagram illustrating a preferred embodiment comprising circuitry for encoding/decoding an MCS on videotape in accordance with the present invention.

A schematic diagram illustrating the electronic components (10) of a videotape recorder apparatus having material content signal (MCS) encoding/decoding in accordance with the present invention is illustrated in FIG. 3. The electronic components 10 of FIG. 3 include recording components 10A and playback components 10B. The recording components 10A function to record program material and an MCS onto a videotape; the playback components (10B) function to detect the recorded program and MCS signals, and to send the appropriate screening device control data signals to the screening circuitry depicted in FIG. 5. Typically, the recording components (10A) will be separate from the playback components (10B) and will be operated by different persons, at different times.

The recording components (10A) include a record circuit (12) for receiving a video signal generated on line 14 and for driving a pair of lines (16) which are connected to a first tape recording head (18). The record circuit (12) and the head (18) are of the type well known by those skilled in the art and suitable for processing video signals and developing therefrom time-varying magnetic fields for selectively magnetizing a track of a video tape, such as the portion of the video tape (20) which is illustrated at 22. The record circuit (12) also generates, once each frame, a vertical or frame-reference, capstan synchronizing pulse on a line (24). Such means of synchronization are well known in the art. See, for example, U.S. Pat. No. 4,167,028 (Tobey), incorporated herein by reference.

Connected to this line (24), encoding circuitry (28) counts the frame-reference pulses and generates a signal in the form of a stream of bits that is synchronized with the frame-reference pulses and that is indicative of an MCS. From the bit stream signal and the frame-reference pulses, the encoding circuitry (28) generates pulses between a pair of lines (30) which are connected to a second tape recording head (32) disposed to selectively magnetize a frame-reference track (34) of the tape (20). Each pulse generated between lines 30 has a leading edge which is time coincident with a frame-reference pulse developed by the record circuit (12) on line 24 and a pulse width encoded by one bit of the MCS bit stream signal. In other words, one pulse width (or pulse duration) modulated pulse is generated between lines 30 each frame. This pulse width modulated signal constitutes the MCS.

One-shot multivibrator 110 has a trigger input connected to line 24, a pulse width determining input connected to line 128 and an output connected to a line 130.

Responsive to each frame-reference pulse developed on line 24, the multivibrator develops an output pulse on line 130 having a leading edge which is coincident with the leading edge of the respective frame-reference pulse. The width of each output pulse (wide or narrow) is determined by the binary signal level developed on line 128.

These selectively wide or narrow output pulses are then amplified by a head driver 132 which develops amplified pulses on lines 30 suitable for driving head 32.

Operationally, when power to the recording circuit (12) is turned on, divide-by-fourteen counter circuit (100) is reset via a power-on reset circuit (not shown). Thereafter, circuit 100 counts each pulse generated on line 24, and once every 14 counts, generates a load signal on line 112. The load signal on line 112 causes a shift register (108) to load an 8-bit MCS data word resident in an 8-bit data latch (102) via an 8-bit data bus (114), as well as a 6-bit data word resident in a sync pattern generator (124) via a 6-bit data bus (126). In an alternative embodiment, the record circuit (12) can supply an initialization pulse to reset the divide-by-fourteen circuit (100), obviating the need for power-on reset circuitry. Circuit 100 is a divide-by-fourteen counter since the data word includes six bits of synchronization information and eight bits from data latch 102, all output to shift register 108.

Each of the fourteen frame-reference pulses generated on line 24 causes the shift register (108) to serially generate on line 128 signal levels corresponding to the individual bit levels of the signals loaded via parallel data busses 114 and 126. An MCS Value Selector (104) consists of eight toggle switches that supply parallel 8-bit logic levels to the 8-bit data latch (102) via the 8-bit parallel data bus (103). The MCS Value Selector (104) can be varied as often as desired by the person or authority encoding the program material. Part of the 8-bit code can be indicative of the material content of any given tape segment. In addition, several other of the 8 bits can be used as an instruction code to enable automatic editing to modify the program material output to be less provocative or explicit. For example, bits 1 through 3 can be used to indicate 1 of 8 possible absolute ratings, similar to an MPAA type rating scheme. Bits 4 through 6 can be used to indicate how the screening device should react upon detection of an impermissible MCS code, and bits 7 and 8 can be used to indicate which alternative program sources are to be selected and inserted into the final output in humanly perceivable form. Naturally, a uniform industry standard for the MCS code data bit format would advantageously be adopted to make the MCS track universally intelligible to all machines (i.e., VCRs).

It will be apparent to the person skilled in the art that the embodiment illustrated in FIG. 3 involves simultaneous recording on a videotape (20) of the program material signal track (22) and a video synchronization/MCS track (34). Obviously, it may be advantageous to record, delete or modify the MCS at a later time. Techniques for editing the pulse width modulated control track of pre-recorded videotapes are known. See, e.g., U.S. Pat. No. 4,703,311 (Roggendorf), incorporated herein by reference. Further, in general, when recording components 10A detect a pulse width modulated control track indicative of an MCS, the recording components (10A) are designed to be able to faithfully replicate such a control track, thus the MCS is passed along to the next generation of videotape copies.

The MCS Value Selector (104) can be eight individual toggle switches connected between a DC power supply and resistors connected to ground suitable for generating an 8-bit data level on parallel data bus (103). The use of eight separate switches will obviously make rapid real time adjustments nearly impossible. Thus, MCS Value Selector (104) can be replaced with an 8-key keyboard scanner that can be used to scan a series of eight switches laid out in a piano keyboard type manner in order to vary the MCS rapidly as needed during the process of initially or subsequently rating the program material. The output of such a keyboard scanner can be provided in parallel over data bus 103. Data latches can also be used to repeatedly generate the current MCS until a change is indicated via the keyboard. Thus, an MCS is generated continuously. Such keyboard scanning techniques are well known in the art. In another embodiment, an MCS will only be generated as desired by the recorder owner/operator, for example, when a certain type of program material is being recorded or previewed.

The playback component (10B) includes a playback head (50) connected by a pair of lines (52) to a playback circuit (54). The head (50) and the playback circuit (54) are suitable for recovering video signals from a time-varying magnetic field, such as produced by a suitably disposed and recorded track (56) of a videotape (58), which signals are transmitted on a line (60). For proper operation, the playback circuit (54) further requires capstan synchronizing frame-reference pulses to be developed on line 62.

The frame-reference pulses are reproduced by a decoder circuit (64) which, with suitably recorded tapes (58), further develops an MCS indicative of the program material content of that portion of the tape that is currently being processed. The MCS can be as complex as desired and can be indicative of the program material content of the audio and/or video signal on that particular or any other portion of the tape. Also, the MCS contains instructions for the screening device as to how the playback will be affected.

The decoder circuit (64) utilizes a playback head (66) disposed in proximity to a frame-reference/MCS track (68) of the tape (58) to generate a series of pulses between a pair of lines (70) for input to the decoder (64). For each recorded pulse, the head (66) develops a pair of pulses, one coincident with each change in magnetization of the tape (i.e., the leading and trailing edges of the pulse).

In response to the first of each pair of pulses, the decoder develops on line 62 a single frame-reference pulse. The decoder (64) further detects the time differential between each pair of pulses. On properly recorded tapes, this time differential, with that between other pairs of pulses in the series, is used to reconstruct each bit of the material content signal. The decoder further uses these bit signals and the frame-reference pulses to develop a periodically reproduced material content signal, which is developed on a bus (72) to identify the current program material content of the tape being replayed at that instant.

The principal components of the decoder (64) which demodulate the reproduced signal include a pair of Schmitt triggers (150 and 152), a one-shot multivibrator (154), and a pair of flip-flops (156) and (158). Schmitt trigger 150 has an input connected by a line (160) to the output of an amplifier (162) which has inputs connected by lines (70) to the playback head (66). The Schmitt trigger 150 also has an output which is connected to line 62.

For convenience, it is assumed that the amplifier (162) is so connected to the head (66) as to develop on line 160 a positive pulse coincident with the flux reversal associated with the leading edge of each recorded pulse and to develop on line 160 a negative pulse coincident with the flux reversal associated with the trailing edge of each recorded pulse.

Schmitt trigger 150 is configured so as to develop a frame-reference pulse on line 62 only in response to the positive pulses developed on line 160 which exceed a level sufficiently high to eliminate most noise pulses.

This arrangement of head 66 amplifier 162 and Schmitt trigger 150 is similar to that employed in many conventional video tape recorders for recovering the normal constant-width frame-reference pulses. It will be understood that whatever means are employed for recording or re-recording the frame-reference/MCS track (68) corresponding to the originally recorded frame-reference/MCS signals (34) will be such that the playback head (66) will be able to appropriately detect said frame-reference/MCS track (68).

Schmitt trigger 152, which has an input connected to line 160, is configured to develop pulses on a line 164 in response only to the negative (trailing edge) pulses developed on line 160 which exceed the noise level.

Multivibrator 154 has a triggering input connected to line 62 for receiving the reproduced frame-reference/MCS pulses and generates a constant width sample-reference output pulse on an output line (166) in response to each pulse developed on line 62. The multivibrator (154) is configured to generate sample-reference pulses having a width which is in between the two pulse widths that are generated by the encoder (28) for recording onto the tape.

Flip-flop 156 has a clocking input connected to line 164, a data input connected to line 166 and generates an output on a line 168.

When clocked by each pulse generated by Schmitt trigger 152 in response to the trailing edge of each of the recorded pulses, flip-flop 156 samples the signal level generated by multivibrator 154 on line 166. The flip-flop (156) thus develops, on line 168, a signal level indicative of the relative width of the recorded and sample-reference pulses, i.e., whether the recorded pulse was wide or narrow.

Flip-flop 158 has a clocking input connected to line 62, a data input connected to line 168 and an output connected to an output line (170). Flip-flop 158 is operative to generate bit signals on line 170 having a logic level similar to those generated on line 168, but which have a constant width and which are delayed one clocking period, or frame period, from the recorded pulses.

The other portion of decoder 64 which converts this series of reproduced bit signals into a reproduced material content signal representing the program material content corresponding to any particular tape segment includes a shift register (172), a synchronizing word signal detector (174) and an 8-bit data latch (178). Shift register 172 has a data input connected to line 170, a clock input connected to line 62 and fourteen parallel outputs, the first six of which form a data bus (184) and the remaining eight of which form a data bus (186).

The reproduced bit signals serially developed on line 170 are clocked into the shift register (172) which generates similar, but delayed appropriately, parallel output levels on each line of data buses 184 and 186.

Synchronization word signal detector 174 has inputs connected to data bus 184 and generates an output on an output line (192). The sync detector (174) includes gates (not shown) for detecting the simultaneous presence of certain bit signals representing the synchronizing word signal when they are generated on data bus 184 and in response develops a pulse on line 192, that causes 8-bit data latch 178 to load its 8-bit data word via 8-bit data bus 186.

Coincident with each synchronizing word signal detected pulse, generated periodically on line 192, 8-bit data latch 178 is reset and loaded via line 192 with the signals developed on bus 186. During the following period, latch 178 develops a similar signal level on 8-bit data bus 72 which represents the reproduced material content signal. Data stored in latch 178 can alternatively be clocked out serially onto a data bus (not shown) by utilizing the clock pulses available on line 62.

Figure 4:
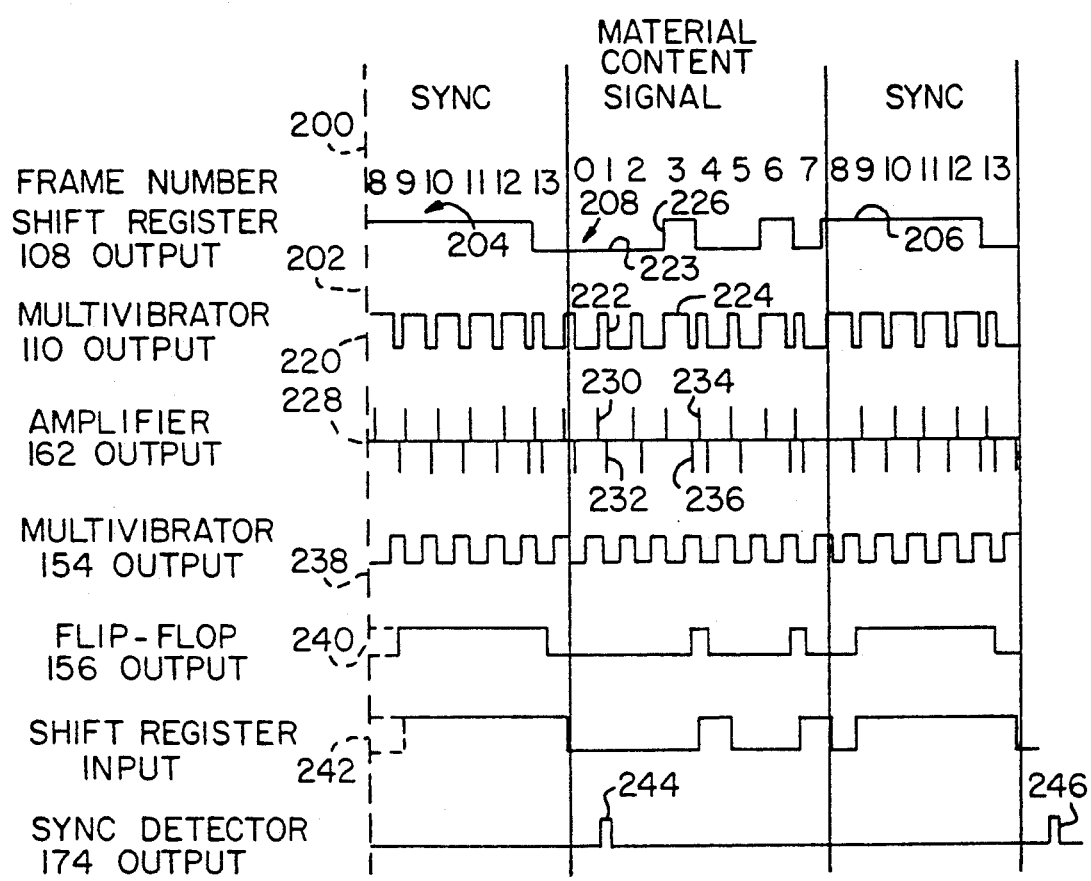
FIG. 4 is a timing diagram of the embodiment depicted in FIG. 3.

With additional reference to FIG. 4, the fourteen frames which are generated during each MCS update period are designated at 200 by the numbers 0 through 13.

The individual bit signals generated by shift register 108 are illustrated at 202 aligned with their corresponding frame reference number. The bits comprising the synchronizing word signal are illustrated at 204 and 206. At 208, the bits representing the material content signal (MCS) are illustrated. The 8-bit data word 00010010 is represented.

These bit signals are coupled by line 128 (FIG. 3) to one-shot multivibrator 110 (FIG. 3), where they control the pulse width of the pulses generated by the multivibrator (110) in response to each of the frame-reference pulses generated on line 24. These pulses are illustrated at 220 including a narrow pulse 222 generated in response to the low logic level signal depicted at 223. Also shown is a wide pulse at 224 corresponding to the high logic level shown at 226.

These pulses when amplified by driver 132 (FIG. 3) cause head 32 (FIG. 3) to appropriately magnetize a portion of a suitably disposed tape (20 in FIG. 3). During playback, this tape will cause playback head 66 (FIG. 3) and amplifier 162 to generate the pulses illustrated at 228. In response to the magnetization produced by the pulse illustrated at 222, amplifier 162 will generate two pulses: a pulse 230 corresponding to the leading edge of pulse 222 and a pulse 232 corresponding to the trailing edge thereof. In a similar fashion, the amplifier will generate a pair of pulses 234 and 236 corresponding to pulse 224. It will be noted that the time spacing between pulses 230 and 232 is relatively short, corresponding to the width of pulse 222, as compared to the longer spacing between pulses 234 and 236.

The output of multivibrator 154, which is clocked by the positive pulses illustrated at 228, is shown at 238. The width of these pulses is in between the width of pulses 222 and 224.

Responsive to the negative-going pulses illustrated at 228, flip-flop 156 samples the level of the signal developed by multivibrator 154 to generate on line 168 the signal illustrated at 240.

In order to normalize the timing and period of the pulses comprising this signal, they are clocked into flip-flop 158 by the output of Schmitt trigger 150 which generates positive pulses corresponding to the positive portion of the signal illustrated at 228. The resultant signal, which is illustrated at 242, is seen to correspond to the signal at 202 but delayed one clocking period therefrom. The output of flip-flop 158 is clocked by the output of Schmitt trigger 150 into shift register 172.

Referring again to FIG. 3, when shift register 172 generates on 6-bit data bus 184 signal levels corresponding to the synchronizing word, synchronization detector 174 generates on line 192 a pulse such as those illustrated at 244 and 246 (FIG. 4). These pulses reset the 8-bit data latch 178 and cause it to load the signals generated on 8-bit data bus 186. The 8-bit data latch (178) is used to generate a similar signal on bus 72 which corresponds to the material content signal. In an alternative embodiment, data latch 178 can be clocked by the frame-reference pulses generated on line 62 to develop on data bus 72 a data signal corresponding to the material content signal. In such an embodiment, a pulse counter can be used to cause the data latch (178) to load data via the data bus (186) every fourteen clock pulses. Similarly, the sync detector (174) can be used to ensure that such a pulse counter is reset each time the sync pattern is detected.

Data bus 72 is an 8-bit data bus that is connected to eight address inputs of Random Access Memory (179). The RAM (179) has a total of sixteen address inputs The remaining eight are connected to the MCS Evaluation Switch (198) via the 8-bit data bus (194). The MCS Evaluation Switch (198) can consist of eight Dual Inline Plug (DIP) switches, connected between a power supply and a resister connected to ground, suitable for providing an 8-bit address with logical "1's" and "0's" to the RAM (179) via bus 194. The RAM (179) has a total of 16 address inputs, and the address is formed by a combination of program material MCS data that are stored along with the program material that originates from data bus 72, along with user (owner/operator) input MCS data that originate from MCS Evaluation Switch (198) from data bus 194. The RAM (179) is large enough to be able to provide an 8-bit data word output on bus 74 in response to a 16-bit address input. The RAM (179) is set to the "write" state via line 195 in normal operation. The RAM (179) functions such that the 8-bit output word on data bus 74 changes continuously to correspond to the inputs along data buses 72 and 194. It is assumed that the RAM (179) is backed up with a battery and is loaded prior to connection to data bus 74, e.g., at the factory. However, its contents of 8-bit words can be reloaded (i.e., changed) by reversing the status of line 195, and playing a specially designated tape that supplies incremented addresses along bus 72, in conjunction with setting the MCS Evaluation Switch (198) incremental, and reading data into the RAM in 8-bit words over bus 74. Obviously, bus 74 will need to be disconnected from the other circuitry depicted in FIG. 5 during this procedure, and an 8-bit data generator will be connected in place thereof. Such a procedure can be carried out to change the overall MCS evaluation characteristics of the system. In this manner, an owner/operator can personalize his or her playback device to respond to various combinations of MCS inputs in certain pre-determined ways. It is assumed that the industry will adopt a standard, and one is proposed herein.

Figure 5:
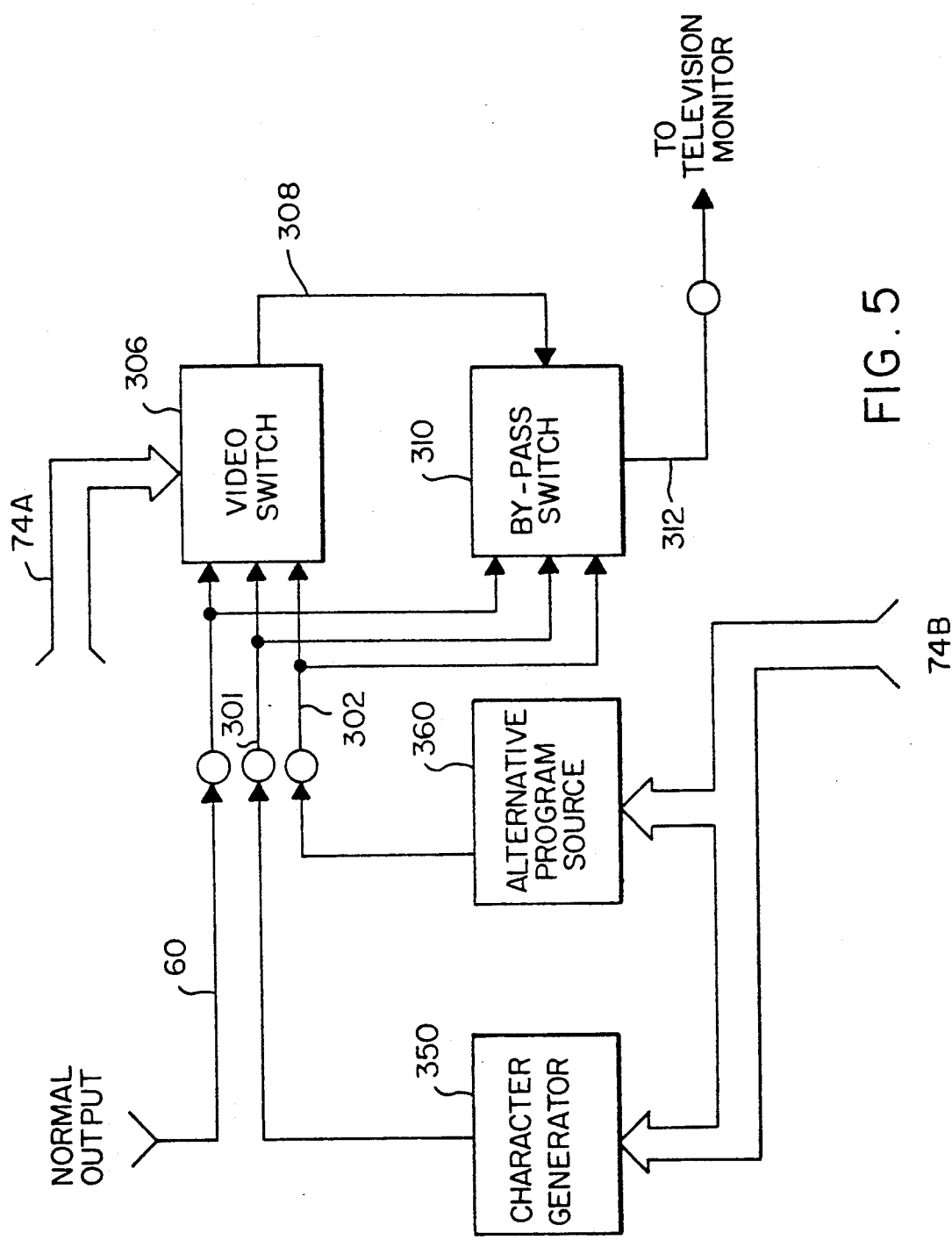
FIG. 5 is circuit diagram for a program screening device of this invention receiving the data output 74A and 74B from the RAM (179) of FIG. 3.

Such an industry standard permits the playback device owner/operator to make preselections that dictate what program material replayed on his or her particular device is to be blocked or edited or permitted to be replayed without interruption. In addition, such a standard provides for the insertion of messages stating that a particular program or program segment is being blocked, and further permits the continuous editing of program material, based on material content. This is accomplished since the MCS decoded from the tape and supplied to the RAM (179) via bus 72 is correlated with the MCS Evaluation Switch (198) set by the playback device owner/operator, which is another 8-bit word supplied to the RAM (179) via bus 194. In operation, MCS Evaluation Switch 198 can be eight separate DIP switches disposed in a lockable box inaccessible to unauthorized device users or users for whom automatic program material editing or blocking is desired, such as small children, for example. The correlation of the combination of these discrete MCS signals lead to the generation of an 8-bit word on data bus 74 suitable for controlling a video switch (306), character generator (350), and alternate program source (360) as shown in FIG. 5. The 8-bit output of the RAM (179) via data bus 74 is split into a 2-bit bus 74A controlling video switch 306 and 6-bit bus 74B controlling alternate program source 360 and character generator 350, shown in FIG. 5.

Video switch (306) passes one of three inputs (60, 301 or 302) onto the television (output) monitor via lines 308 and 312, via a bypass switch (310). Line 60 carries the normal video program material output from the videotape (58 in FIG. 3). Line 301 carries the video output from character generator 350. Generator 350 can, for example, be programmed with one or more messages such as "THIS PROGRAM IS BLOCKED", "DO YOUR HOMEWORK BEFORE WATCHING TELEVISION", or even, "YOU ARE NOT OLD ENOUGH TO WATCH THIS SCENE. ASK YOUR PARENTS TO CHANGE THE MCS EVALUATION SWITCH TO . . . ". It is anticipated that character generator 350 will be equipped with internal memory responsive to the 6-bit data word address over bus 74B, which may prompt up to $2^6$ such messages.

Line 302 carries the video output of an alternate program source (APS) (360). The APS (360) can be a second videotape player that can, for example, provide lower-rated substitute scenes for an R-rated movie supplied via line 60. Hence, when the R-rated videotape is replayed, at the onset of an explicit or graphic scene, video switch 306 automatically in response to 2-bit control bus 74A will switch from the line 60 input to the line 302 input, thus supplying a less explicit or graphic, e.g., PG-13, substitute scene. Thus, the owner/operator via the MCS Evaluation Switch (198 in FIG. 3), can preset the playback device to guarantee the less explicit or graphic (PG-13) output. Six-bit data bus 74B can control the timing and sequencing of character generator 350 and alternative program source 360 to provide the proper video output along lines 301 and 302, respectively. Lines 301 and 302 are substitutes for line 60, and can be switched on or off as quickly and as often as needed, and will do so in response to the output of the RAM (179), which in turn reflects the MCS data recorded on the tape supplied via bus 72 and the MCS evaluation by the user supplied via bus 194. In addition, the 8-bit data words stored in the RAM (179) provide yet a third level of program screening criteria.

By-pass switch 310, which preferably is also secured (lockable), can be used to override all presets and to dictate that all output is supplied along line 312 via one of the input video source lines 60, 301 or 302. In this way, the automatically blocked or edited signal along line 308 is bypassed, and the user can watch unblocked, unedited program material (if line 60 is selected), with no editing messages. Video switch 306 can also be set via data bus 74A to select a grounded input state (not shown), such that no output is provided along line 308.

Video switch 306 can also be a video mixer used to superimpose the output of character generator 350 upon the signal supplied via line 60. Thus, for example, the program can continue to be replayed, but a warning message will simultaneously appear.

This method of blocking, message warning generation, and editing is easily applied to over-the-air radio and television broadcasts and cablecasts, audio signals, optical photographs (for example, by way of a bar code MCS on the perimeter of a motion picture image) and for computer databases. With laser compact discs, for example, separate tracks can be reserved for supplying an alternate program source (360). Thus, two or more versions of the same movie can reside on a single laser disc. An R- rated original can reside with a supplemental MCS that can cause PG-13 rated scenes to be inserted and edited into the output program material automatically upon the demand of the preset playback device. Therefore, the program material is automatically screened before a viewer is exposed to it.

A proposed MCS standard is set forth as follows. When a playback device owner purchases a playback device, the RAM (179) is loaded with 8-bit words suitable for controlling the device as shown in FIG. 5. Therefore, for every combination of a stored MCS originating via bus 72 and user input MCS signal originating via bus 194, a 16-bit data address is generated that can access the RAM (179), causing an 8-bit data word to be output bus 74. The 8-bit words stored in the RAM (179) dictate how video switch 306 will operate, and how character generator 350 and alternate program source 360 similarly must operate. Therefore, no combinational logic need be used, since the appropriate functional results are all stored in the RAM (179).

In a much simpler embodiment, the single rating standard of the MPAA can be adopted where the 3-bit codes of Table 1 as follows are entered via MCS Value Selector 104 (FIG. 3). Then, the RAM (179) can be replaced with simple combinational logic that compares the authorized MCS value set by the owner/operator via DIP switches 198. If this setting is exceeded, a 1-bit control line 74 caused video switch 306 (FIG. 5) to select the input connected to ground, as opposed to the normal input connected to line 60. Thus, output is blocked whenever the owner/operator-set MPAA rating is exceeded. Such an MCS can be recorded on tape 20 either as a prefacing signal or periodically, randomly, or otherwise, and will be a non-complex signal for simple playback blocking.

In a further embodiment, RAM (179) can be an electronically erasable read-only memory (EEROM). Also, an EEROM can store any number of alternative rating standards, or EEROMs can be substituted to change the overall program screening criteria. Therefore, various rating authorities or rating suppliers can send an EEROM to interested users, and upon inserting the EEROM into their playback device, that rating authority's rating standards will be transparently utilized by the viewer. Hence, the correlation between a user input MCS and a stored MCS is preset by the rating authority in the EEROM, and this correlation can be as restrictive or permissive as that rating authority deems appropriate. Therefore, a playback device owner/operator has two levels of evaluation; one via the settings on MCS Evaluation Switch 198 and the second by way of the EEROM preset as, in FIG. 3, RAM 179.

Many other embodiments will be envisioned by those in the art. For instance, a microprocessor can replace all of these logical and data handling functions.

An MCS data word consists of eight bits, D0 through D7. D0 through D2 can be used in this proposed embodiment to convey the program material rating as evaluated by, for example, the producer of the program material. The producer's 3-bit code (D0 through D2) enables eight discrete rating levels to be output via bus 72 to RAM 179, as illustrated in Table 1 below, where an expanded MPAA-type rating scheme is proposed.

TABLE 1

| D0 | D1 | D2 | Rating |
| --- | --- | --- | --- |
| 0 | 0 | 0 | G |
| 0 | 0 | 1 | PG (soft) |
| 0 | 1 | 0 | PG |
| 0 | 1 | 1 | PG-13 (soft) |
| 1 | 0 | 0 | PG-13 |
| 1 | 0 | 1 | R (soft) |
| 1 | 1 | 0 | R |
| 1 | 1 | 1 | X |

This scheme provides that MCS signal encoding can provide more granularity than the standard five MPAA ratings. The MCS signals of Table 1 originate from MCS Value Selector (104) during the encoding process. The producer performing the encoding process is then left with bits D3 through D7 to convey other information to the subsequent playback device. For example, the producer may convey with bits D3 through D7 a recommended course of action where the rating conveyed by bits D0 through D2 exceeds a certain owner-preset viewing level, as input via MCS Evaluation Switch 198.

The playback device owner/operator inputs a separate 8-bit data word via DIP switches (198) which comprise the MCS Evaluation Switch. Similarly, bits D0 through D2 are set to be indicative of the *maximum* level the owner/operator deems acceptable (for him or herself or those viewers under his or her supervision), and D3 through D7 correspond to how the owner/operator wishes the playback device to respond to various ratings that exceed the preselection level input via bits D0 through D2. There are $2^{16}$ possible overall addresses, or in excess 64K. Each address accessed causes a separate 8-bit word to be output on data bus 74. Hence, 512K of RAM will suffice in this embodiment as RAM 179.

Data bus 74 consists of eight data lines, and the two most significant bits (D0 to D1) form data bus 74A, which controls the video switch 306, and data bus 74B is formed with the six least significant bits (D2 through D7) to control the program substitution elements (either the character generator (350) or the alternate program source (360)). Since video switch 306 has only four states in the embodiment depicted in FIG. 5, only two bits are necessary for bus 74A, and hence, bus 74B has the remaining six bits assigned to it. The four states of video switch 306 are depicted in Table 2 below, and data bus 74A is assumed to have only two bits.

TABLE 2

| Bus 74A | | Line 308 Output |
| --- | --- | --- |
| D0 | D1 | |
| 0 | 0 | Line 60 (normal playback) |
| 0 | 1 | Line 301 |
| 1 | 0 | Line 302 |
| 1 | 1 | no output (select a grounded input) |

As shown in Table 2, state "11" corresponds to no output, which is a functional equivalent of disabling the playback device with no substitute signal (i.e., no output from lines 301 or 302).

Data bits D2-D7 are used to control the program substitution elements (350 and 360). With a laser disk, for example, an alternate program source (360) can consist of a separate pick-up head scanning another part of the disk simultaneously with the main pick-up head, and would supply input line 302 as called upon via bus 74B bits D2-D7. A number of bits on this bus could in effect address particular sectors on the disk, and the addresses are a function of where the producer stored substitute scenes. In effect, some of these bits call up the proper substitution source (350, 360, ground, or combinations thereof), and further address discrete messages carried via line 301 or particular program tracks available via line 302.

As an example of how data bus 74B might control program output, two bits (out of six, e.g., D2 and D3) via bus 74B may be used to indicate 4 separate messages available over line 301, originating in the character generator (350), and the same two bits can correspondingly address a particular track available via line 302, originating in alternative program source (360). Another 2 bits, namely D0-D1, bus 74A, then select whether line 301 or line 302 will be selected at a given instant. In this example four bits (D4 through D7) remain and can be used to further control other program substitution functions as may be available, such as, where a multiplicity of substitution elements 350 and/or 360 are available.

For television broadcasts, auxiliary broadcasts known as SAP codes are available. SAP (standing for Special Audio Program) signals or codes are commonly used to convey bilingual programs, or other supplementary information. In another embodiment, a commonly available SAP signal can be imported as the alternative program source (360) to provide a substitute audio program, and a separate SAP signal may carry the appropriate MCS analogous to that carried via bus 72 to the playback device. For radio broadcasts, various inaudible subcarrier signals can also be similarly used, as can vertical blanking interval techniques for television broadcasts. Closed captioned broadcasts, for example, are transmitted in this manner (i.e., the closed captioned signal is transmitted via the vertical blanking interval).

Obviously, many other variations of the foregoing embodiments are possible. For example, it is envisioned that a microprocessor may be used to replace the shift registers, synchronization pattern generator and detector, and the data handling circuitry illustrated in FIG. 3. Furthermore, the microprocessor data bus may be used to control the devices shown in FIG. 5, through the use of an overall address bus with appropriate device decoders.

It is further envisioned that other equivalent methods of modulation or encoding may also be employed in addition to the above-described pulse width, or pulse duration, modulation. For example, transmitting an MCS via inaudible subcarriers, vertical blanking intervals or laser-readable bar codes are contemplated.

It is further contemplated that after having read the preceding disclosure, other alterations and modifications of the present invention will become apparent to those skilled in the art. For instance, in the foregoing illustrative examples, references to changing explicit or graphic scenes have always lowered the rating of the output scene; however, it will be recognized that the nature of a scene may be rendered more explicit or more graphic by substitution, using the methods described. It is intended that the following claims be interpreted to cover all such obvious alterations and modifications.

I claim:

1. A method for selectively screening program material comprising
   (1) storing to a storage medium a program material signal which is electronically detectable by playback equipment, said playback equipment being capable of recognizing and replaying the stored program material signal in a humanly perceivable form,
   (2) simultaneously or subsequently supplementing the program material signal with a material content signal electronically detectable by a program material screening device, wherein said material content signal does not interfere with replay or duplication of the program material signal from said storage medium, and
   (3) connecting to said playback equipment a program material screening device such that upon detecting said material content signal, said program material screening device automatically, in response to said material content signal, selectively disables replay of said program material signal, or causes substitution of alternative programming signals for output, by said playback equipment.

2. A program material screening device adapted to be connected to program material playback equipment capable of recognizing and replaying in humanly perceivable form a program material signal stored in a storage medium comprising (a) recognition means for detecting any supplemental material content signal stored with said program material signal and (b) execution means for automatically selectively preventing or altering replay of the program material signal by the playback device upon detecting a material content signal by said recognition means.

3. A method according to claim 1, wherein said playback equipment includes a telephone, a video cassette recorder, a television, a radio, a record player, a tape player, a film projector, or a computer.

4. A method according to claim 1, wherein said program material signal is stored on magnetic tape, film, records, microchips or laser readable discs.

5. A method according to claim 1, wherein said material content signal originates from the same source as the program material signal.

6. A method according to claim 1, wherein said material content signal is transmitted from a different source than the program material signal.

7. A method according to claim 6, wherein said material content signal is stored with said program material signal in the same medium as the program material signal.

8. A screening device according to claim 2, wherein said playback equipment includes a telephone, video cassette recorder, television, radio, record player, tape player, film projector, computer, or combinations thereof.

9. A screening device according to claim 2, wherein said program material signal is recorded on magnetic tape, film, records, microchips or laser readable discs.

10. A screening device according to claim 2, wherein said material content signal is recorded on magnetic tape, records, microchips or laser readable discs.

11. A screening device according to claim 2, wherein said material content signal is originates simultaneously from the same source as the program material signal.

12. A screening device according to claim 2, wherein said recognition means is capable of detecting a material content signal that is transmitted from a different source than the storage medium containing the program material signal.

13. A videotape screening device adapted to be connected to a videotape replay device comprising
   (a) recognition means capable of detecting a pre-recorded material content signal residing on a videotape together with a pre-recorded program material signal, and capable of providing an instruction signal output in response to detecting said material content signal,
   (b) execution means capable of detecting said instruction signal output from recognition means (a) and activating in response to said instruction signal at least one program alteration circuit, said at least one program alteration circuit being capable of automatically blocking replay by said replay device of the program material signal from said videotape or of automatically altering the output of said replay device upon detection of said instruction signal output.

14. A videotape screening device as defined in claim 13, including a plurality of program alteration circuits.

15. A videotape screening device as defined in claim 13, wherein said at least one program alteration circuit includes a circuit that provides alternative program signals for replay by said replay device.

16. A videotape screening device as defined in claim 13, wherein said at least one program alteration circuit includes a circuit that shuts off said replay device.

17. A videotape screening device as defined in claim 13, wherein said at least one program alteration circuit includes a circuit that causes said replay device to replay a pre-recorded message in lieu of replaying said program material signal.

18. A videotape screening device as defined in claim 13, wherein said at least one program alteration circuit includes a circuit that causes said replay device to replay a pre-recorded message superimposed on the video output upon replay of said program material signal.

* * * * *

EX PARTE REEXAMINATION CERTIFICATE (4847th)
United States Patent
Olivo, Jr.

(10) Number: US 5,172,111 C1
(45) Certificate Issued: Sep. 16, 2003

(54) STORED MEDIA SCREENING DEVICE

(75) Inventor: John W. Olivo, Jr., Secaucus, NJ (US)

(73) Assignee: Everquest Co., Omaha, NE (US)

Reexamination Request:
No. 90/006,044, Jun. 27, 2001

Reexamination Certificate for:
Patent No.: 5,172,111
Issued: Dec. 15, 1992
Appl. No.: 07/457,409
Filed: Dec. 18, 1989

Related U.S. Application Data

(63) Continuation-in-part of application No. 07/091,646, filed on Aug. 31, 1987, now Pat. No. 4,888,796.

(51) Int. Cl.$^7$ .................. G11B 20/00; G11B 27/02; G11B 15/18; H04M 1/00; H04M 11/08
(52) U.S. Cl. .................. 386/126; 386/95; 386/94; 360/13; 360/27; 360/69; 358/908; 369/30.19; 379/101.09; 379/199; 379/67.1; 379/87; 455/26.1
(58) Field of Search .................. 386/94, 4, 5, 127, 386/68, 95, 125; 360/13, 27, 69; 369/30.18, 30.23, 30.24, 47.55, 53.37, 53.21; 358/908; 711/163; 379/101.1

(56) References Cited

U.S. PATENT DOCUMENTS

| | | | |
|---|---|---|---|
| 3,732,365 A | | 5/1973 | Rando et al. |
| 3,790,700 A | | 2/1974 | Callais et al. |
| 3,919,462 A | | 11/1975 | Hartung et al. |
| 4,068,264 A | | 1/1978 | Pires |
| 4,081,754 A | | 3/1978 | Jackson |
| 4,114,139 A | * | 9/1978 | Boyd et al. |
| 4,147,769 A | | 4/1979 | Dea et al. |
| 4,225,884 A | | 9/1980 | Block et al. |
| 4,229,765 A | | 10/1980 | Sanger |
| 4,266,098 A | * | 5/1981 | Novak |
| 4,331,974 A | | 5/1982 | Cogswell et al. |
| 4,333,110 A | | 6/1982 | Faerber et al. |
| 4,333,113 A | * | 6/1982 | Kalinowski |
| 4,390,901 A | | 6/1983 | Keiser |
| 4,420,769 A | | 12/1983 | Novak |
| 4,449,198 A | | 5/1984 | Kroon et al. |

(List continued on next page.)

FOREIGN PATENT DOCUMENTS

GB     1545765     5/1979

OTHER PUBLICATIONS

"Z–Tac™, Zenith's tiered, addressable converter system", circa 1981.
"Tiering in the Zenith Z–Tac, Tiered Addressable Converter System", circa 1981.
"Tocom 55 Plus™" General Information Manual, circa May 1980.
"Tocom 55 Plus™ Model 5510A Home Information Terminal", circa May 1980.
"Tocom 55 Plus™ Model 5504A Addressable Terminal", circa May 1980.
"Description and Use of Z–TAC Tagging Levels", circa 1981.
Letter dated Jul. 17, 1981 to Michael J. Mannheim from Walter S. Ciciora, Ph.D.
Letter dated Aug. 10, 1981 to Samuel G. Barney from Walter S. Ciciora Ph.D.

*Primary Examiner*—Regina N. Holder

(57) ABSTRACT

A program material screening device is provided whereby the owner/operator of a program material playback device such as a videocassette player, television, laser disc player, motion picture projector, phonograph, or the like may automatically and selectively prevent the reproduction into humanly perceivable form of unwanted program material. The screening device is capable of recognizing non-interfering material content signals stored along with the program signals that are reproduced by the program material playback device, and is capable of automatically disabling the playback device in response to the recognition of the material content signal.

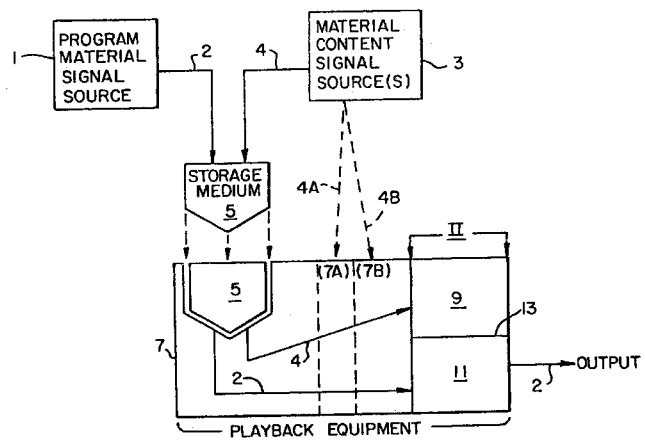

U.S. PATENT DOCUMENTS

| | | | |
|---|---|---|---|
| 4,475,123 A | 10/1984 | Dumbauld et al. | |
| 4,488,179 A | 12/1984 | Kruger et al. | |
| 4,510,623 A | 4/1985 | Bonneau et al. | |
| 4,520,404 A | 5/1985 | Von Kohorn | |
| 4,528,589 A | 7/1985 | Block et al. | |
| 4,536,791 A | * 8/1985 | Campbell et al. | |
| 4,554,584 A | 11/1985 | Elam et al. | |
| 4,567,531 A | * 1/1986 | Tabata | |
| 4,574,319 A | * 3/1986 | Konishi | |
| 4,588,857 A | * 5/1986 | Arsem | |
| 4,591,664 A | * 5/1986 | Freeman | |
| 4,591,931 A | * 5/1986 | Baumeister | |
| 4,598,288 A | * 7/1986 | Yarbrough et al. | |
| 4,600,921 A | * 7/1986 | Thomas | |
| 4,602,297 A | * 7/1986 | Reese | |
| 4,605,964 A | 8/1986 | Chard | |
| 4,605,973 A | 8/1986 | Von Kohorn | |
| 4,618,895 A | * 10/1986 | Wright | |
| 4,621,285 A | 11/1986 | Schilling et al. | |
| 4,685,131 A | 8/1987 | Horne | |
| 4,695,904 A | * 9/1987 | Shinyagaito et al. | |
| 4,718,107 A | * 1/1988 | Hayes | |
| 4,750,213 A | 6/1988 | Novak | |
| 4,794,474 A | * 12/1988 | Dwyer et al. | |
| 4,814,883 A | 3/1989 | Perine et al. | |
| 4,837,623 A | 6/1989 | Motoyama | |
| 4,862,268 A | 8/1989 | Campbell et al. | |
| 4,872,151 A | 10/1989 | Smith | |
| 4,905,280 A | 2/1990 | Wiedemer | |
| 4,916,737 A | 4/1990 | Chomet et al. | |
| 4,930,158 A | 5/1990 | Vogel | |
| 4,930,160 A | 5/1990 | Vogel | |
| 4,939,596 A | * 7/1990 | Takayama et al. | |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 13 are determined to be patentable as amended.

Claims 3–12 and 14–18, dependent on an amended claim, are determined to be patentable.

New claims 19–105 are added and determined to be patentable.

1. A method for selectively screening program material comprising
   (1) storing to *selected regions of* a storage medium a program material signal which is electronically detectable by playback equipment said playback equipment being capable of recognizing and replaying the stored program material signal in a humanly perceivable form,
   (2) simultaneously or subsequently supplementing the program material signal with a material content signal electronically detectable by a program material screening device, wherein said material content signal does not interfere with replay or duplication of the program material signal from said storage medium, and
   (3) connecting to said playback equipment a program material screening device such that upon detecting said material content signal, said program material screening device automatically, in response to said material content signal, selectively disables replay of said program material signal, [or] *and* causes substitution of alternative programming signals *stored on alternative regions of said storage medium* for output, by said playback equipment.

2. A program material screening device adapted to be connected to program material playback equipment capable of recognizing and replaying in humanly perceivable form a program material signal stored in a storage medium comprising (a) recognition means for detecting any supplemental material content signal stored with said program material signal *on a storage medium* and (b) execution means [for] *configured to select one of (i)* automatically selectively preventing [or] *replay of the program material signal and (ii)* altering replay of the program material signal by the playback device upon detecting a material content signal by said recognition means, *wherein said altering replay of the program material signal comprises playing alternative program material stored on the storage medium.*

13. A videotape screening device adapted to be connected to a videotape replay device comprising
   (a) recognition means capable of detecting a pre-recorded material content signal residing on a videotape together with a pre-recorded program material signal, and capable of providing an instruction signal output in response to detecting said material content signal,
   (b) execution means capable of detecting said instruction signal output from recognition means (a) and activating in response to said instruction signal at least one program alteration circuit, said at least one program alteration circuit being capable of automatically blocking replay by said replay device of the program material signal from said videotape or of automatically altering the output of said replay device *by emitting an audio signal* upon detection of said instruction signal output.

*19. The method of claim 1 wherein said material content signal provides content information for the entire program material.*

*20. The method of claim 1 wherein said material content signal provides content information for portions of the program material.*

*21. The method of claim 1 wherein said alternative programming signals include an audio component.*

*22. The method of claim 1 wherein said playback equipment includes a plurality of sources for alternative programming signals.*

*23. The method of claim 22 wherein said plurality of sources includes a character generator and said storage medium.*

*24. The method of claim 22 wherein said material content signal is decoded to select at least one of said plurality of sources.*

*25. A method for selectively screening program material comprising*
   *(1) storing to a storage medium a program material signal and alternative programming signals which are electronically detectable by playback equipment, said playback equipment being capable of recognizing and replaying the stored program material signal in a humanly perceivable form,*
   *(2) simultaneously or subsequently supplementing the program material signal with a material content signal electronically detectable by a program material screening device, wherein said material content signal does not interfere with replay or duplication of the program material signal from said storage medium, and*
   *(3) connecting to said playback equipment a program material screening device such that upon detecting said material content signal, said program material screening device automatically, in response to said material content signal causes substitution of alternative programming signals from said storage medium for output by said playback equipment.*

*26. A program material screening device adapted to be connected to program material playback equipment capable of recognizing and replaying in humanly perceivable form a program material signal stored in a storage medium comprising*
   *(a) recognition means for detecting any supplemental material content signal stored with said program material signal and*
   *(b) execution means for automatically selectively altering replay of the program material signal by the playback device upon detecting a material content signal by said recognition means, wherein said altering replay of the program material signal includes emitting a signal having an audio component.*

*27. The program material screening device of claim 26 wherein said program material signal is stored on a laser readable disc.*

*28. The program material screening device of claim 26 wherein said playback equipment includes a telephone, film* projector, video cassette recorder, television, radio, record player, tape player, computer, or combinations thereof.

29. A method for selectively screening program material comprising
   (1) storing to a storage medium a program material signal and an alternative programming signal which are electronically detectable by playback equipment, said playback equipment being capable of recognizing and replaying the stored program material signal and alternative programming signal in a humanly perceivable form,
   (2) simultaneously or subsequently supplementing the program material signal with a material content signal electronically detectable by a program material screening device, wherein said material content signal does not interfere with replay or duplication of the program material signal from said storage medium,
   (3) connecting to said playback equipment a program material screening device, and
   (4) reading said program material signal from a first location on said storage medium and reading said material content signal, such that upon detecting said material content signal, said program material screening device automatically, in response to said material content signal, ceases reading said program material signal from said first location and begins reading said alternative programming signal read from a second location on said storage medium for output by said playback equipment.

30. The method of claim 29 wherein said storage medium is partitioned into tracks, wherein said alternative programming signal is stored on separate tracks from said program material signal.

31. The method of claim 29 further comprising decoding said material content signal to generate an address for said alternative programming signal.

32. The method of claim 29 wherein said decoding step comprises using a lookup table stored in memory.

33. The method of claim 29 wherein said material content signal is comprised of a plurality of bits, and wherein some or all of said data bits provide an address of said alternative locations on said storage medium.

34. The method of claim 29 wherein said material content signal is comprised of a plurality of bits and wherein said or all of said data bits operate as control signals to configure said program material screening device to disable replay of said program material signal or to cause substitution of said alternative programming signal.

35. The method of claim 29 further comprising decoding said material content signal to select at least one of a plurality of alternative programming sources for substituting.

36. The method of claim 29 wherein said material content signal is comprised of a plurality of bits, and wherein some or all of said data bits provide an address of instructions stored in memory.

37. The method of claim 29 wherein said step of storing to a storage medium a program material signal and an alternative programming signal comprises storing digital information to a computer disk or laser readable disk.

38. The method of claim 29 wherein said playback equipment includes a computer.

39. A program screening device adapted to be connected to program material playback equipment capable of recognizing and replaying in humanly perceivable form a program material signal stored in a storage medium comprising
   (a) recognition means comprising a recognition circuit including a pick-up head, and a decoder circuit coupled to the pick-up head, for detecting any supplemental material content signal stored with said program material signal and
   (b) execution means for automatically selectively preventing or altering replay of the program material signal by the playback device upon detecting a material content signal by said recognition means comprising an execution circuit comprising a video signal routing circuit and its control logic, coupled to a display device and to said recognition circuit and receiving a control signal therefrom, the execution circuit configured to select for coupling to said display device one of said program material signal stored on said storage medium and an alternative material signal stored on said storage medium, to said display device.

40. The program material screening device of claim 39 wherein said signal routing circuit comprises a video switch.

41. The program material screening device of claim 40 wherein said video switch is a microprocessor.

42. The program material screening device of claim 40 wherein said video switch and its control logic are comprised of a microprocessor.

43. The program material screening device of claim 39 further comprising a character generator generating a character signal, wherein the execution circuit is configured to couple both the program material signal and the character signal to said display device simultaneously, and wherein the character signal is displayed in a humanly perceivable form superimposed over the program material signal displayed in a humanly perceivable form.

44. The program material screening device of claim 39 wherein said decoder circuit comprises an amplifier coupled to said pick-up head, a first circuit receiving as an input a signal comprised of pulses and outputting a signal comprised of bits, and a second circuit coupled to said first circuit and receiving said signal comprised of bits.

45. The program material screening device of claim 44, wherein said first circuit comprises first and second Schmitt triggers coupled to said amplifier, a one-shot multivibrator coupled to said first Schmitt trigger, a first flip-flop coupled to said second Schmitt trigger and to said one-shot multivibrator, and a second flip-flop coupled to the output of said first flip-flop.

46. The program material screening device of claim 44 wherein said second circuit comprises a shift register coupled to an output of said second flip-flop, a synch detector coupled to said shift register, a latch coupled to said shift register, and a memory coupled to said latch.

47. A method for selectively screening program material comprising
   (1) storing medium a program material signal and an alternative programming signal which are electronically detectable by playback equipment, said playback equipment including a first component at a broadcast location and a second component at a receiving location an capable of recognizing and replaying the stored program material signal in a humanly perceivable form,
   (2) simultaneously or subsequently supplementing the program material signal with a material content signal electronically detectable by a program material screening device, wherein said material content signal does not interfere with replay or duplication of the program material signal from said storage medium, and
   (3) connecting to said playback equipment a program material screening device such that upon detecting said material content signal, said program material screening device automatically, in response to said material content signal, selectively disables replay of said program material signal, or causes substitution of said alternative programming signals stored on said storage medium for output, by said playback equipment.

48. The method of claim 47 wherein said step of supplementing the program material signal occurs substantially simultaneously with playing back said program material signal on said first component of said play back equipment.

49. The method of claim 47 further comprising supplementing the program material signal with a second material content signal substantially simultaneously with playing back said program material signal on said first component of said play back equipment.

50. The method of claim 47 wherein said first component of said play back equipment includes a tape player capable of converting said program material signal stored on said tape, and any material content signal stored on said tape into a broadcast signal.

51. The method of claim 47 further comprising the step of distributing said storage medium to a broadcaster prior to said step of supplementing the program material signal with a material content signal.

52. The method of claim 47 further comprising the further steps of distributing the storage medium to a broadcaster subsequent to said step of supplementing the program material signal with a material content signal that is stored on said storage medium; and supplementing the program material signal with an additional material content signal after the step of distributing the storage medium.

53. The method of claim 52 wherein the step of supplementing the program material signal includes broadcasting the material content signal simultaneously with the program material signal.

54. A program material screening device adapted to be connected to program material playback equipment capable of recognizing and replaying in humanly perceivable form a program material signal stored in a storage medium comprising (a) recognition means for detecting any supplemental material content signal stored with said program material signal and (b) execution means for automatically selectively preventing playback of the program material by the playback device or altering replay of the program material signal by the playback device by emitting an audio signal upon detecting a material content signal by said recognition means.

55. The program material screening device of claim 54 wherein said masking signal includes an audio component.

56. The program material screening device of claim 54 wherein said program material screening device in physically integrated into said playback equipment.

57. The program material screening device of claim 54 wherein said playback equipment includes a telephone, a video cassette player, a television, a radio, a record player, a tape player, a film projector, a compact disc player, a computer, or an optical disc reader.

58. The program material screening device of claim 54 wherein said playback equipment includes a first component located at a broadcast station and a second component located at a viewer's location.

59. The program material screening device of claim 54 wherein said recognition means comprises a recognition circuit including a pick-up head, and a decoder circuit; and said execution means comprises an execution circuit comprising a video signal routing circuit and its control logic, coupled to a display device and to said recognition circuit and receiving a control signal therefrom, the execution circuit configured to couple either said program material signal stored on said storage medium, or an alternative material signal stored on said storage medium, to said display device.

60. The program material screening device of claim 59 wherein said decoder circuit includes an amplifier coupled to said pick-up head, a first circuit coupled to said amplifier, and a second circuit coupled to said first circuit.

61. The program material screening device of claim 60 wherein said first circuit includes first and second Schmitt triggers coupled to said amplifier, a one-shot multivibrator coupled to said first Schmitt trigger, a first flip-flop coupled to said second Schmitt trigger and to said one-shot multivibrator, and a second flip-flop coupled to the output of said first flip-flop.

62. The program material screening device of claim 60 wherein said second circuit includes a shift register coupled to an output of said second flip-flop, a synch detector coupled to said shift register, a latch coupled to said shift register, and a memory coupled to said latch.

63. A method for preventing a computer user unauthorized access to sexually explicit or excessively graphic or violent material comprising (1) storing program material to a computer database which is electronically detectable by said computer, said computer being capable of recognizing and replaying the stored program material signal in humanly perceivable form, (2) simultaneously or subsequently supplementing the program material with a material content signal electronically detectable by a program material screening device and storing said material content signal to said computer database, wherein said material content signal does not interfere with replay or duplication of the program material from said computer database, and (3) connecting to said computer a program material screening device such that upon detecting said material content signal, said program material screening device automatically, in response to said material content signal, selectively disables replay of said program material, or causes substitution of alternative programming for output, by said computer.

64. The method of claim 63 wherein said alternative programming material signal is also stored to said computer database.

65. The method of claim 63 wherein said computer database is a computer text database.

66. The method of claim 63 wherein said computer is a component of play back equipment, located at the computer user's location, and wherein the play back equipment further comprises additional components located at a program material distribution center.

67. The method of claim 63 wherein said computer database is located on said additional components at said program material distribution center.

68. The method of claim 63 wherein said program material signal is transmitted using telephone transmissions.

69. The method of claim 68 wherein said material content signal is transmitted over telephone lines.

70. The method of claim 63 wherein said program material screening device causes substitution of alternative programming signals for output by said computer by instructing said computer to obtain a substitute program material signal from another source.

71. A method for selectively screening video game content comprising (1) storing to a video game cartridge a program material signal including a first version of a video game scene which is electronically detectable by playback equipment said playback equipment including a video game machine being capable of recognizing and replaying the stored program material signal in a humanly perceivable form, (2) simultaneously or subsequently supplementing the program material signal with a material content signal electronically detectable by said video game machine, wherein said material content signal does not interfere with replay or duplication of the video game from said video game cartridge, and (3) connecting to said playback equipment, by physically integrating therein, a program material screening device such that upon detecting said material content signal, said program material screening device automatically, in response to said material content signal, causes substitution of an alternative version of said video game scene stored on alternative regions of said video game cartridge for output, by said video game machine.

72. The method of claim 71 wherein the material content signal is stored on the video game cartridge by the video game cartridge manufacturer.

73. The method of claim 71 wherein the material content signal is provided by a third party other than the video game cartridge manufacturer.

74. The method of claim 71 further comprising decoding said material content signal to determine an address on said video game cartridge for said alternative version of said video game scene.

75. A program material screening device adapted to be connected to program material playback equipment capable of recognizing and replaying in humanly perceivable form a program material signal stored on a first plurality of addressable data tracks of an optical disk storage medium comprising (a) recognition means for detecting any supplemental material content signal stored with said program material signal on said optical disk and (b) execution means for automatically selecting one of plurality of program alteration functions, said plurality of functions including preventing replay of the program material signal by the playback device and altering replay of the program material signal by the playback device by substituting an alternative program material signal stored on a second plurality of addressable data tracks on said optical disk, upon detecting a material content signal by said recognition means.

76. The program material screening device of claim 75 wherein the program material screening device is connected to program material playback equipment by being physically integrated into said program material playback equipment.

77. The program material screening device of claim 75 wherein the recognition means comprises a pick-up head, a signal amplifier coupled to said pick-up head, conversion circuitry coupled to said amplifier, a decoder circuit coupled to said conversion circuitry, and a memory coupled to said decoder circuit.

78. The program material screening device of claim 75 wherein said playback equipment includes a computer.

79. The program material screening device of claim 75 wherein said playback equipment includes a laser readable disk player.

80. The program material screening device of claim 75 wherein a first pick-up head scans said first plurality of data tracks and a second pick-up head scans said second plurality of data tracks.

81. A method for selectively screening program material comprising (1) storing to a storage medium a program material signal which is electronically detectable by playback equipment, said playback equipment being capable of recognizing and replaying the stored program material signal in a humanly perceivable form, (2) simultaneously or subsequently supplementing the program material signal with a material content signal electronically detectable by a program material screening device, wherein said material content signal does not interfere with replay or duplication of the program material signal from said storage medium, (3) broadcasting said program material signal and said material content signal to said playback equipment, (4) broadcasting an alternative version of said program material signal to said playback equipment; and (5) connecting to said playback equipment a program material screening device such that upon detecting said material content signal, said program material screening device automatically, in response to said material content signal, causes substitution of said alternative version of said program material signal for output by said playback equipment.

82. The method according to claim 81 wherein said transmission medium includes a television broadcast network.

83. The method according to claim 81 wherein said transmission medium includes a cable television network.

84. The method according to claim 81 wherein said step of supplementing the program material signal with a material content signal is performed by a television broadcaster, so that said playback device is activated in response to said material content signal.

85. A method for selectively screening computer content comprising (1) storing to a computer disc of a first computer a program material signal which is electronically detectable by a second computer, said second computer being capable of recognizing and replaying the stored program material signal in a humanly perceivable form, (2) simultaneously or subsequently supplementing the program material signal with a material content signal electronically detectable by a program material screening device, wherein said material content signal does not interfere with replay or duplication of the program material signal from said computer disc, (3) transmitting the program material signal and the material content signal to said second computer from said first computer;

(4) connecting to said first computer or to said second computer a program material screening device such that upon detecting said material content signal, said program material screening device automatically, in response to said material content signal, selectively disables replay of said program material signal, or causes substitution of alternative programming signals for output, by said second computer.

86. The method of claim 85 wherein said program material screening device includes a microprocessor running instructions to provide logical and data handling functions.

87. The method of claim 85 wherein said alternative programming signals are stored on said computer disc.

88. The method of claim 85 wherein the step of transmitting includes data transmission via a cable network.

89. The method of claim 85 wherein said program material signal is a computer database.

90. The method of claim 89 wherein said computer database is a text database.

91. The method of claim 85 wherein said material screening device decodes said material content signal to obtain an address of said alternative programming signals.

92. The method of claim 91 wherein said address is a logical or physical address on said computer disc.

93. The method of claim 85 wherein said program material signal is assigned a rating by a third party rating entity.

94. A program material screening device adapted to be connected to program material playback equipment capable of recognizing and replaying in humanly perceivable form a program material signal stored on an optical disc comprising (a) recognition means including a first pick-up head scanning said optical disc and reading therefrom a program material signal and a second pick-up head scanning said optical disc and reading therefrom an alternative programming signal, an amplifier coupled to said pick-up head, a signal converter coupled to said amplifier, digital logic coupled to said signal converter, the recognition means configured to detect any supplemental material content signal stored with said program material signal and (b) execution means including a signal source selection circuit, a signal routing circuit coupled to said signal source selection circuit, and control logic coupled to said recognition means to receive therefrom an indication of said material content signal, and an output device coupled to said signal routing circuit and receiving therefrom either said program material signal or said alternative programming signal.

95. The program material screening device of claim 94 wherein said program material screening device and said program material playback equipment comprise a computer.

96. The program material screening device of claim 94 wherein said program material screening device and said program material playback equipment comprise an optical disc player.

97. The program material screenign device of claim 96 wherein said optical disc player is a compact disc player or a laser disc player.

98. A method for selectively screening program material comprising (1) storing to a storage medium a program material signal which is electronically detectable by playback equipment, said playback equipment being capable of recognizing and replaying the stored program material signal in a humanly perceivable form, (2) simultaneously or subsequently supplementing the program material signal with a material content signal electronically detectable by a program material screening device, wherein said material content signal does not interfere with replay or duplication of the program material signal from said storage medium, (3) distributing said storage medium to a broadcast center, (4) retrieving said program material signal from said storage medium at said broadcast center, (5) transmitting said program material signal to an audience, (6) connecting to said playback equipment a program material screening device, (7) selecting at least one of a plurality of program alteration functions, said plurality of program alteration functions including disabling replay of said program material signal and substituting alternative programming signals stored on the same storage medium, and (8) in response to said material content signal and to said selecting function, disabling replay of said program material signal, or causing substitution of said alternative programming signals for output, by said playback equipment.

99. The method of claim 98 wherein said playback equipment includes a first component at said broadcast center, and a second component at a location of said audience.

100. The method of claim 98 further comprising supplementing said material content signal stored on said storage medium with an additional material content signal prior to said step of transmitting.

101. The method of claim 98 wherein said broadcast center is a cable television network.

102. The method of claim 98 wherein said broadcast center is a broadcast television network.

103. The method of claim 98 wherein said program material screening device causes substitution of alternative programming signals for output, by said playback equipment by substituting alternative programming signals that were stored on said storage medium.

104. The method of claim 103 wherein said alternative programming signals are transmitted simultaneously with said program material signal.

105. The method of claim 98 wherein said step of connecting to said playback equipment a program material screening device includes connecting via a broadcast, a cablecast, or a telephone transmission.

* * * * *